United States Patent Office 3,358,112
Patented Dec. 12, 1967

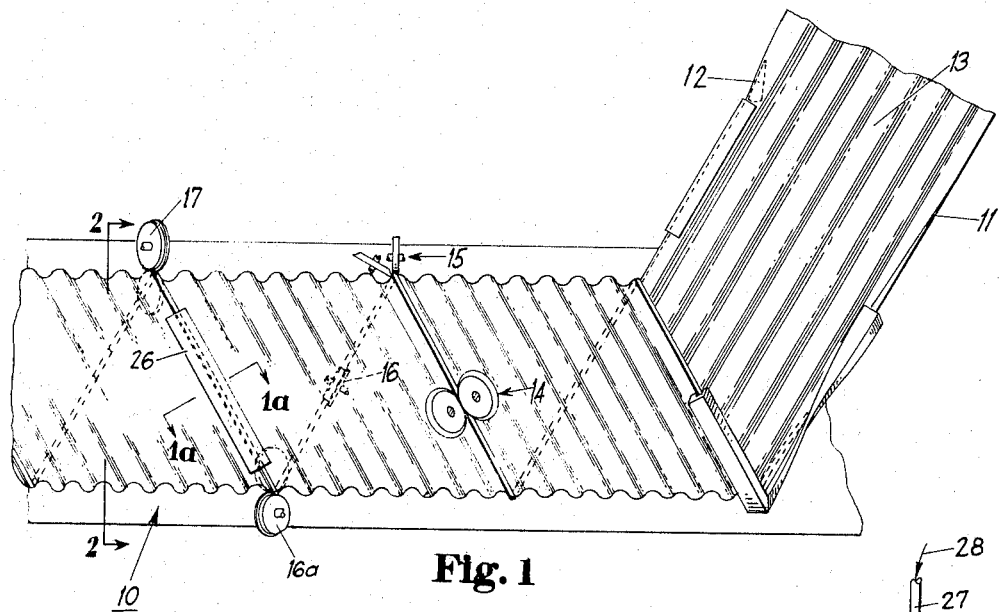
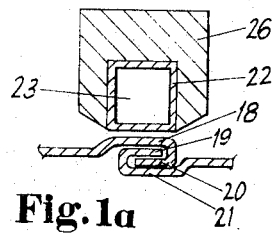
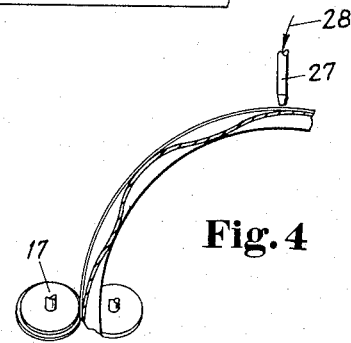
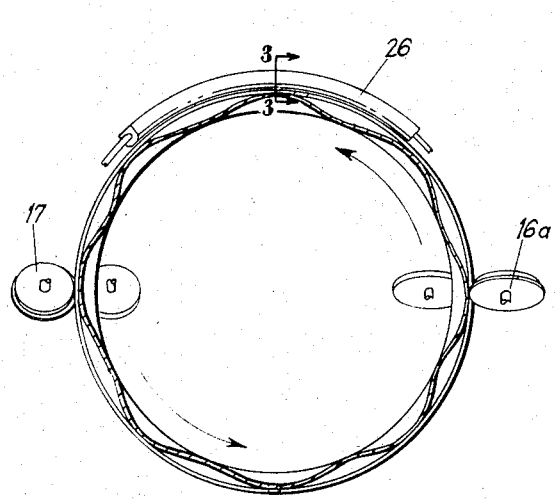
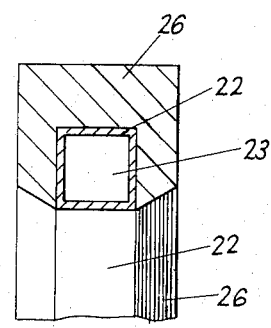

3,358,112
WELDED HELICAL LOCK SEAM PIPE AND METHOD AND APPARATUS FOR MANUFACTURING THE SAME
John H. Timmers, Middletown, Ohio, assignor to Armco Steel Corporation, Middletown, Ohio, a corporation of Ohio
Filed July 24, 1963, Ser. No. 297,411
7 Claims. (Cl. 219—9.5)

This invention relates to welded helical lock seam pipe as well as to a method of manufacturing such pipe and a machine for carrying out the method. Helically joined metal pipe may be generally subdivided into two broad classifications, viz, welded pipe and mechanically joined pipe such as lock seam pipe. In cases where a watertight seam is required or where pipe must be pressure-proof, it is necessary to provide a welded seam. Such pipe is usually made of relatively heavy gauge by forming a strip of steel into a helix and butt welding the edges. When this is done, various procedures must be carried out to insure proper seam formation because of the fact that camber is generally present to a greater or lesser degree in the strip from which the pipe is formed.

When pipe is helically formed from lighter gauge steels, the problems resulting from non-uniformity of the strip, such as camber, are much more difficult to compensate for to the extent that it is extremely difficult, if not impossible, to make good quality butt or lap welded seam pipe from this material.

It is, however, possible to make excellent quality helical lock seam pipe from relatively light gauge material because the lock seam has the ability to compensate for minor changes in width of strip or angle at which the strip enters the machine, so that the lock seam will be a mechanically sound seam. Such a lock seam, however, is not waterproof nor pressure-proof. There is presently a need for waterproof and pressure tight pipe in gauges which are lighter than those from which standard spiral pipe is currently being manufactured and the principal object of this invention is to make possible the production of a welded helical lock seam pipe.

In fulfilling this major object of the invention, it is an ancillary object of the invention to provide means for rapidly heating the formed lock seam up to welding temperature at a point before the seam is pressed solidly home against the formed pipe, so that when the seam is pressed solidly home while at welding temperature, the interfaces between the seam forming elements will be forge welded together.

These and other objects of the invention which will be pointed out in more detail hereinafter or which will become apparent to one skilled in the art upon reading these specifications, are accomplished by that certain construction and arrangement of parts and by that series of method steps and are embodied in that product of which the following will describe exemplary embodiments.

Reference is made to the drawing forming a part hereof and in which:

FIG. 1 is a somewhat diagrammatic top plan view of a portion of a conventional machine for making helical lock seam pipe.

FIG. 1a is an enlarged cross-sectional view taken on the line 1a—1a of FIG. 1.

FIG. 2 is a cross-sectional view taken on the line 2—2 of FIG. 1.

FIG. 2a is a fragmentary cross-sectional view similar to FIG. 2 showing the position of a plasma arc nozzle.

FIG. 3 is a fragmentary cross-sectional view of the inductor only on a greatly enlarged scale taken on the line 3—3 of FIG. 2.

Briefly, in the practice of the invention a helical lock seam is produced in well known manner by feeding a strip of metal into a machine, providing seam forming elements along the two edges of the strip and forming the strip into a helix with the seam forming elements in interengaging relationship. The seam forming elements are then compressed together to form a seam, and the seam is progressively inclined and is finally pressed solidly home against the formed pipe. This may be accomplished according to the teachings of the Freeze Patents Nos. 2,136,942 and 2,136,943. Just before the seam is finally to be pressed solidly home against the formed pipe, there are provided according to the present invention means to rapidly heat the seam up to welding temperature, i.e. a temperature of from 1800° to 2400° F. so that when the seam passes between rolls which press the seam solidly home against the formed pipe, the interengaged seam forming elements will be welded together at all their interfaces.

Referring now in greater detail to the drawing, a helical lock seam pipe forming machine is generally indicated at 10. This machine may be in all respects like that disclosed in the Freeze patents identified above. Reference is made to the said Freeze patents for a detailed description of the machine. The seam elements formed along the edges 11 and 12 of the incoming strip 13 (which has been shown as corrugated) are brought into interengagement at the end of the first convolution and a series of rollers then function to compress the seam and progressively to incline the seam. These rollers are indicated generally at 14, 15, 16 and 16a. The details of the mounting of these rollers is not necessary to an understanding of the present invention and reference may be had to the said Freeze patents for such details. The roller 16a is the final roller which compresses the seam solidly against the formed pipe. At this point the seam will have the appearance shown in FIG. 1a and it will be seen that there are actually four thicknesses of steel in the seam as indicated at 18, 19, 20 and 21. In order to make a pressure-tight and waterproof seam, it is desirable that the interfaces between the portions 18 and 19, 19 and 20, and 20 and 21 be welded together and it is therefore necessary in a very short period of travel to heat the entire seam from the portion 18 all the way down to the portion 21 up to welding temperature. This may be accomplished in a number of ways. In FIGS. 1, 2 and 3 there is shown the use of induction heating. Thus, a heavy copper bar 22 is provided which is connected to a suitable source of electrical power, as for example a generator to provide 300 kilowatts of alternating current at a frequency of say 3 kilocycles per second. The bar 22 is made to follow the contour of the seam helically around the pipe as best seen in FIGS. 1 and 2, and it is preferably hollow as indicated at 23, so that a coolant may be passed therethrough from the pipe 24 to the pipe 25. A field of induction may, of course, be concentrated on the seam by shielding the tubing with laminations of ferromagnetic material such as silicon steel, as is indicated at 26. The surface of the conductor 22 which is presented to the seam, is preferably spaced approximately one-quarter inch from the surface of the seam.

When the seam is thus subjected to induction heating, it is very rapidly heated up to welding temperature of 1800° to 2400° F. and this heating is so rapid that the induction member 22 need extend only about one-quarter of a revolution around the pipe and with the pipe traveling at the normal speed at which the machine produces lock seam pipe, i.e. thirty to seventy feet per minute, the seam is heated up to the required temperature in about one-quarter of a revolution. Then when the seam is subjected to the final compression roller 17, at least two, and preferably all interfaces of the seam forming elements are forge-welded together and thus there is produced a waterproof and pressure-tight pipe. It will be understood that if the pipe will not have to carry great pressure, it will be watertight if only two interfaces are welded together. If, however, the pipe is to withstand high internal pressure, it will be preferred to insure that all interfaces are forge-welded together.

It is believed that the reason why no lock seam pipe has heretofore been forge-welded is that those skilled in the art did not realize or understand that the heat applied at the surface of the seam had to be, or that it could be, transferred through the metal to the internal laps in order to provide the requisite welding temperature at the various interfaces between the seam forming elements.

The requisite heating may also be produced by a plasma arc and in FIG. 2a, which is similar to FIG. 2 but fragmentary, there is shown a plasma nozzle 27 fed from a plasma source diagrammatically indicated by the arrow 28. The plasma nozzle is disposed in the same general position as the induction heating element 22 and it can very rapidly heat the seam throughout all the seam forming elements to forge-welding temperature.

It will be understood further that other heating means may be used provided they can heat the seam throughout its extent at a speed fast enough to provide forge welding temperature, having regard for the speed at which it is desired to form the pipe. Thus, in addition to induction heating and plasma arc (either transferred arc or non-transferred arc), natural gas heating or oxyacetylene heating can be used in certain situations. Similarly, laser or maser devices can be used and under some circumstances fusion or electric welding can be used. The criterion as to the specific heating means employed is simply the ability of the heating means to provide a heat all the way through the seam rapidly enough so that the entire seam may be brought up to forge welding temperature by the time it is subjected to the final pressure roll 17 at the particular speed at which the machine is manufacturing pipe.

It will be understood that modifications may be made within the scope of the disclosure without departing from the spirit of the invention and no limitation not specifically set forth in the claims is intended.

What is claimed is:

1. In a machine for forming helical lock seam pipe from strip material, wherein means are provided to form along the two edges of said strip material cooperating seam forming elements, and to form said strip material into a helix and to guide said cooperating seam forming elements into interengagement, and to compress the interengaged elements to form a three-layer seam, to progressively incline the seam and to press the seam solidly home against the formed pipe thereby producing an interlocked four-layer seam; means disposed after said seam forming and inclining means and ahead of the final pressing means to heat the formed seam throughout its entire depth rapidly to welding temperature, whereby said final pressing means serves to forge weld the three interfaces of said seam forming elements.

2. A machine according to claim 1, wherein said heating means comprises an induction element, said induction element being constituted of a bar of copper having a curvature such that it is disposed in close proximity to the helical seam, and having a length such that it extends over about one-quarter of one spiral lead of said seam, and means to supply high frequency electrical current to said induction element.

3. A machine according to claim 2, wherein said induction element is hollow, and means are provided to pass a cooling medium therethrough.

4. A machine according to claim 1, wherein said heating means comprises means to create a plasma arc and its playing a jet of plasma against the seam.

5. In the process of forming welded helical lock seam pipe from strip material, wherein cooperating seam forming elements are formed along the two edges of strip material, and said strip material is then formed into a helix with said cooperating seam forming elements in the form of a flange along one edge of the strip material and a U-shaped hook element along the other edge of the strip material in interdigitated relation, and said interdigitated seam forming elements are then compressed to form a three-layer upstanding seam, and said seam is then progressively inclined and finally pressed solidly home against the formed pipe to form a four-layer interlocked seam; the improvement which consists in rapidly heating said seam throughout its entire depths up to welding temperature after it has been inclined and just before said seam is pressed solidly home against the formed pipe whereby when said seam is finally pressed solidly home against the formed pipe the three interfaces between said seam forming elements are forge-welded together.

6. The process of claim 5, wherein said seam is heated by means of electrical induction and which includes supplying to the electrical inductor electrical energy of about 300 kilowatts at a frequency of about 3 kilocycles per second.

7. The process of claim 5, wherein the rapid heating of said seam is accomplished by means of a plasma arc.

References Cited

UNITED STATES PATENTS

| | | | |
|---|---|---|---|
| 375,435 | 12/1887 | Alden | 219—62 |
| 1,422,834 | 7/1922 | Colby | 72—50 |
| 1,793,280 | 2/1931 | Williams | 138—154 |
| 1,841,300 | 1/1932 | Scarritt | 138—154 |
| 1,869,224 | 7/1932 | Scarritt | 29—477.3 |
| 1,918,137 | 7/1933 | Scarritt | 72—50 |
| 2,031,138 | 2/1936 | Taylor | 29—477.3 |
| 2,136,942 | 11/1938 | Freeze | 113—35 |
| 2,136,943 | 11/1938 | Freeze | 113—35 |
| 2,873,353 | 2/1959 | Rudd | 219—62 |
| 3,073,945 | 1/1963 | Osterer et al. | 219—62 |

RICHARD J. HERBST, *Primary Examiner.*

LEWIS J. LENNY, *Examiner.*